United States Patent
Morel et al.

(10) Patent No.: US 8,687,920 B2
(45) Date of Patent: Apr. 1, 2014

(54) METHOD AND DEVICE FOR THE INVARIANT-AFFINE RECOGNITION OF SHAPES

(75) Inventors: Jean-Michel Morel, Paris (FR); Guoshen Yu, Palaiseau (FR)

(73) Assignees: Ecole Polytechnique, Palaiseau (FR); Ecole Normale Superieure, Cachan (FR)

( * ) Notice: Subject to any disclaimer, the term of this patent is extended or adjusted under 35 U.S.C. 154(b) by 438 days.

(21) Appl. No.: 12/993,499

(22) PCT Filed: May 18, 2009

(86) PCT No.: PCT/FR2009/050923
§ 371 (c)(1),
(2), (4) Date: Nov. 19, 2010

(87) PCT Pub. No.: WO2009/150361
PCT Pub. Date: Dec. 17, 2009

(65) Prior Publication Data
US 2011/0069889 A1    Mar. 24, 2011

(30) Foreign Application Priority Data
May 19, 2008    (FR) ...................................... 08 53244

(51) Int. Cl.
*G06K 9/32* (2006.01)
*G06K 9/46* (2006.01)

(52) U.S. Cl.
USPC .............................. 382/296; 382/305; 382/190

(58) Field of Classification Search
CPC ..... G06T 7/003; G06T 7/0024; G06T 7/0028; G06T 3/0075
See application file for complete search history.

(56) References Cited

U.S. PATENT DOCUMENTS

| | | | |
|---|---|---|---|
| 5,161,204 A * | 11/1992 | Hutcheson et al. | 382/157 |
| 5,581,276 A * | 12/1996 | Cipolla et al. | 345/156 |
| 5,802,525 A * | 9/1998 | Rigoutsos | 1/1 |
| 5,911,035 A * | 6/1999 | Tsao | 706/16 |
| 6,005,986 A * | 12/1999 | Ratner | 382/288 |
| 6,181,832 B1 * | 1/2001 | Maas, III | 382/294 |
| 6,507,661 B1 * | 1/2003 | Roy | 382/107 |
| 6,711,293 B1 | 3/2004 | Lowe | |
| 6,771,808 B1 | 8/2004 | Wallack | |
| 6,912,293 B1 * | 6/2005 | Korobkin | 382/100 |
| 6,975,755 B1 * | 12/2005 | Baumberg | 382/154 |

(Continued)

FOREIGN PATENT DOCUMENTS

WO    2005017820 A1    2/2005

OTHER PUBLICATIONS

Ben-Arie, Jezekiel and Zhiquian Wang. "Gabor Kernels for Affine-Invariant Object Recognition," Gabor Analysis and Algorithms, H. Feichtinger and T. Strohmer, eds., 1997.*

(Continued)

*Primary Examiner* — Manav Seth
(74) *Attorney, Agent, or Firm* — Young & Thompson

(57) ABSTRACT

A method for the recognition of objects in at least one digital image includes: a) simulating from the digital image a plurality of digital rotations and at least two digital tilts different from 1 in order to develop a simulated image for each rotation-tilt pair; and b) applying an algorithm generating values that are invariant in translation, rotation and zoom onto the simulated images in order to determine so-called SIF (scale invariant features) local characteristics used for recognizing objects. The SIFT method can be used in step b.

18 Claims, 4 Drawing Sheets

(56) References Cited

U.S. PATENT DOCUMENTS

| | | | | |
|---|---|---|---|---|
| 7,136,710 | B1* | 11/2006 | Hoffberg et al. | 700/83 |
| 7,289,662 | B2* | 10/2007 | Keaton et al. | 382/154 |
| 7,454,037 | B2* | 11/2008 | Higgins | 382/103 |
| 7,493,243 | B2* | 2/2009 | Choi et al. | 703/2 |
| 7,653,264 | B2* | 1/2010 | Hero et al. | 382/294 |
| 7,697,792 | B2* | 4/2010 | Keating et al. | 382/305 |
| 7,702,185 | B2* | 4/2010 | Keating et al. | 382/305 |
| 7,881,559 | B2* | 2/2011 | Park et al. | 382/284 |
| 7,912,321 | B1* | 3/2011 | Simonson | 382/294 |
| 7,961,982 | B2* | 6/2011 | Sibiryakov et al. | 382/294 |
| 8,004,576 | B2* | 8/2011 | Sharma | 348/222.1 |
| 8,090,160 | B2* | 1/2012 | Kakadiaris et al. | 382/118 |
| 8,126,206 | B2* | 2/2012 | Tsurumi | 382/103 |
| 8,265,395 | B1* | 9/2012 | Silver et al. | 382/181 |
| 8,432,442 | B2* | 4/2013 | Nam et al. | 348/135 |
| 2004/0081360 | A1 | 4/2004 | Lee et al. | |
| 2005/0238198 | A1* | 10/2005 | Brown et al. | 382/103 |
| 2006/0285755 | A1* | 12/2006 | Hager et al. | 382/224 |
| 2009/0238460 | A1* | 9/2009 | Funayama et al. | 382/181 |

OTHER PUBLICATIONS

Mikolajczyk, Krystian and Cordelia Schmid, "An Affine Invariant Interest Point Detector," Proc. European Conf. Computer Vision, p. 128-142, 2002.*

Ben-Arie, Jezekiel and Zhiquian Wang, "Shape Description and Invariant Recognition Employing Connectionist Approach," Int. J. Patt. Recogn. Artif. intell. vol. 16, Issue 01, Feb. 2002, p. 69.*

Yu, Guoshen and Jean-Michel Morel. "A Fully Affine Invariant Image Comparison Method." Acoustics, Speech and Signal Processing, 2009 (conference held Apr. 24, 2009).*

Morel, Jean-Michel and Guoshen Yu. "ASIFT: A New Framework for Fully Affine Invariant Image Comparison," SIAM Journal on Imaging Sciences, vol. 2 Issue 2, Apr. 2009, p. 438-469.*

Mikolajczyk, Krystian and Cordelia Schmid. "Scale and Affine Invariant Interest Point Detectors." International Journal of Computer Vision, vol. 60 Issue 1, Oct. 2004 (Article accepted Jan. 22, 2004).*

Lowe D G: "Distinctive image features from scale-invariant keypoints", International Journal of Computer Vision, Jan. 1, 2004, pp. 91-110, vol. 60, No. 2, Dordrecht, NL, XP002377339.

Pritchard D et al: "Cloth Motion Capture", Eurographics, 2003, vol. 22, No. 3.

French Search Report, Dated Feb. 25, 2009, in FA 71384/ FR 0853244.

International Search Report, dated Jan. 13, 2010, in PCT/FR2009/050923.

* cited by examiner

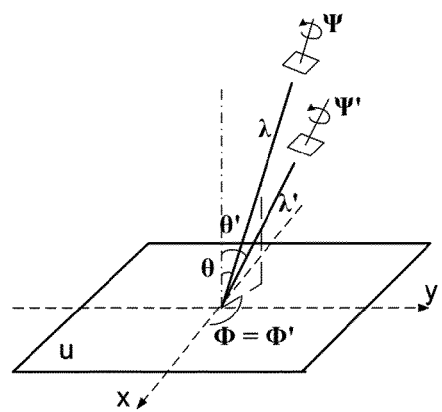

$\theta = 30°$, $\theta' = 60°$, $\Phi = \Phi'$
$t = 1/\cos\theta = 2/\sqrt{3}$, $t' = 1/\cos\theta' = 2$
Transition tilt : $t/t' = 1/\sqrt{3}$

  

Initial image | Image obtained after tilt t | Image obtained after tilt t'

FIGURE 7

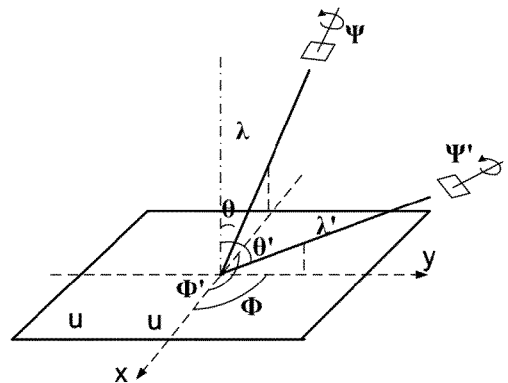

$\theta = 60°$, $\theta' = 75.3°$, $\Phi = \Phi'+90°$
$t = 1/\cos\theta = 2$, $t' = 1/\cos\theta' = 4$
Transition tilt : $tt' = 8$

  

Initial image | Image obtained after tilt t | Image obtained after tilt t'

FIGURE 8

METHOD AND DEVICE FOR THE INVARIANT-AFFINE RECOGNITION OF SHAPES

BACKGROUND OF THE INVENTION

1. Field of the Invention

The present invention relates to a method and a device for object recognition in at least one digital image.

2. Description of the Related Art

Generally, the aim of a method of recognition of shapes is to recognize an object or a type of object that has been photographed when the relative position of the object and of the real or simulated photographing device are unknown, or when the object has possibly been distorted. The object itself can be a graphic and non-physical object (for example a digital logo or the result of a simulation). For simplicity the photographing device (or device for simulating photographing) will be called "camera" hereinafter, but the invention relates to any acquisition of images, and any distortions or geometric deformations of the view of an object caused by the change in position of the camera relative to the object, or by the particular characteristics of the device for acquisition or simulation of images. Moreover, the objects photographed or simulated do not need to be identical, it is sufficient that they are similar, a common situation for objects resulting from industrial or graphical production. One or more images of the object to be recognized are available: these are the "query" images. The image or images where the object is sought do not necessarily contain it. The purpose is to find reliable signs for knowing whether the object is present in the images analysed, and to give its position in the image.

The first simplification proposed by all methods dealing with the recognition problem is to assume that the object has a sufficiently regular relief for the local deformations in the target images to be interpreted as planar affine deformations of the query image. Most physical objects of interest are in fact volumes whose surface has plane or slightly curved faces. Exceptions are rare. As an example of an exception, consider a tree without leaves, the appearance of which can change dramatically on changing the viewing angle, or the ripples of a liquid. Now, any regular deformation in the mathematical sense of the (differentiable) term is, locally in the image, close to an affine deformation. This is the case in particular for the apparent deformation of the optical image of a fairly regular object, when this apparent deformation of the image is caused by the movement of the camera, or by the optical distortions of the camera, or by the movement of the object, or even by a gradual deformation of the object itself. For example, in the case of a flat object the deformation of its image caused by a change of position of the camera observing it is a plane homography, which is at every point tangent to an affine application. If, moreover, the camera is quite distant from the object observed, this deformation of the image resembles an overall affine transformation more and more. Conversely, any affine transform of the image plane with positive determinant can be interpreted as a deformation of the image due to the movement in space of a camera observing the image and located far from the image (virtually at infinity). It should be recalled that an affine deformation of the (x,y) coordinate plane is written in the form $$x'=ax+by+e, y'=cx+dy+f,$$

and the parameters a, b, c, d form a matrix with two rows and two columns, which we shall designate A. The affine deformation of an image u(x,y) is therefore written $$u(x',y')=u(A(x,y)+(e,f))$$

For the reasons given above, the problem of recognition of shapes can be reduced to finding local characteristics of images that are invariant modulo an affine transformation. These characteristics are then robust to the apparent local deformations caused by the relative movements of the object and of the camera, as well as to the distortions caused by the acquisition device, for example the optical distortion of a lens, and finally to the distortions due to the deformations of the object itself.

Hereinafter, the terms "tilt" and "digital" will be used; these are terms commonly used by a person skilled in the art and which mean tilt and digital respectively. The terms SIF and SIFT will also be used; these are abbreviations known to a person skilled in the art, signifying respectively "scale invariant feature" and "scale invariant feature transform".

Document U.S. Pat. No. 6,711,293 (Lowe) describes a method called the SIFT method for "scale invariant feature transform" making it possible to recognize objects in an image taken from the front by a camera. In this document U.S. Pat. No. 6,711,293 it is considered that exploring the entire affine space would be prohibitive and inefficient. Lowe finally comments that the defect of invariance of his SIFT method could be compensated by taking real views of 3D objects spaced 30 degrees apart.

The document "Cloth Motion Capture", by D. Pritchard and W. Heidrich, *Eurographics* 2003/*volume* 22, *Number* 3, describes a method for determining SIFT characteristics, in which, from an initial image taken from the front, four simulated images are produced with a tilt equal to two. The first simulated image is obtained for a tilt realised on the horizontal, the second on the vertical, the third and fourth on two axes of 45 degrees. This method therefore provides four simulated images in order to improve recognition.

BRIEF SUMMARY OF THE INVENTION

The present invention relates to a novel method of recognition of a portion of a planar image that has undergone an arbitrary affine transformation. The purpose of the invention is also to permit object recognition in an image photographed obliquely, compared with frontal viewpoint opposite the object, or also oblique. The purpose of the invention is therefore to improve the recognition rate regardless of the viewpoints.

At least one of the aforementioned objectives is achieved with a method for object recognition in at least one digital image in which:

a) simulating from said digital image a plurality of digital rotations and at least two digital tilts different from 1 in order to develop a simulated image for each rotation-tilt pair; and b) applying an algorithm generating values that are invariant in translation, rotation and zoom onto the simulated images in order to determine local characteristics called SIF (scale invariant features) and used for recognising objects.

In other words, starting from the digital image, several changes of directions of the optical axis of a camera observing the digital image at infinity are simulated. Although each position of the camera is defined by a rotation-tilt pair, a person skilled in the art will easily understand that other transformations of varying complexity can be used for defining a position of the camera. Nevertheless, the invention is remarkable in that any change of orientation of the camera axis can be represented as a rotation followed by a tilt.

The method according to the present invention is based on the observation that any affine transformation of the plane can be interpreted as a transformation of the image due to a change of position of a camera at infinity. On the basis of this interpretation, an affine transformation can be resolved into the product:
- of a movement of the camera along the optical axis, or zoom (1 parameter),
- of a translation parallel to the focal plane (2 parameters),
- of an axial rotation of the camera (1 parameter),
- and of a change of direction of the optical axis of the camera (2 parameters).

Algorithms of the prior art, such as the SIFT method, enable an image to be recognized for which the first three transformations are arbitrary. They correspond to the four parameters of axial rotation of the camera, zoom, and translation parallel to the focal plane (and therefore perpendicular to the optical axis). The SIFT method makes it possible to determine SIFs ("scale invariant features"), i.e. more precisely invariant characteristics by zoom, translation and rotation of the image, but does not take into account the last two parameters relating to change of direction of the optical axis of the camera. Lowe provides additional views to improve the sensitivity of the SIFT method, but these are real views, implying additional manipulations as well as a considerable increase in data to be processed. Pritchard only provides four simulated images, as it was considered that to go further would be counterproductive and prohibitive in terms of calculation time. The present invention goes beyond a generally assumed prejudice, according to which the calculation time would be prohibitive if the number of simulated images were increased.

With the method according to the present invention, all the distortions of the image due to the variations of the two parameters not treated in the SIFT method, namely the parameters of change of direction of the optical axis of the camera, can be simulated with sufficient accuracy.

With the invention, firstly several simulated images are produced in relation to said last two parameters, which are described by a rotation and a tilt. In particular, the rotation-tilt pairs can be inscribed in a hemisphere above the digital image. The rotation and the tilt are considered to correspond respectively to the longitude and latitude in space. Pritchard in fact describes four rotations and a single tilt value from a frontal image. With the invention, the initial images can be obtained by non-frontal viewpoint, i.e. oblique up to about 80 degrees.

The systems of the prior art permit recognition of objects with a tolerance for changes of orientation of the camera axis leading to real tilts of up to 3 or 4. The method according to the invention can handle tilts up to a value exceeding 40. In fact, in the situation where a camera has taken two views of a flat object with tilts t and t', simulation of one of these oblique views starting from the other one can require simulating a tilt up to the value tt'. For example, for latitudes of 80°, the tilt is 5.76 and the combined tilt when the oblique views have a difference of longitude equal to 90° is equal to $5.76^2=33.2$. A tilt much greater than 2, for example up to 30 or more, is therefore possible, and the method according to the invention makes it possible to recognize such views that are oblique from one another.

This method is therefore capable of recognizing all possible views of the image at infinity, since the simulated views now only need one invariant recognition algorithm by translation, rotation and zoom, a problem that has been well mastered in the state of the art, with the calculation of SIFs.

The principle on which the method according to the invention is based is not to assume that the whole image has undergone a single affine transformation, which is only true for a completely plane object and a camera at infinity. In contrast, by applying a recognition algorithm that takes into account all the affine transformations of the image, complete recognition is certainly achieved, as each deformation is locally tangent to an affine application. The situation can be summarized by saying that simulation of all the affine transformations is sufficient for effectively simulating all the local deformations of the image.

According to an embodiment of the invention, the method is applied to an image called the query and to an image called the target, the SIFs of the simulated images of the query being compared with the SIFs of the simulated images of the target so as to recognize similar or identical objects between the query and the target.

As a non-limitative example, when the method according to the invention is applied to one or more images called queries and one or more images called targets, the SIFs relating to the query can be determined during a previous stage of calibration so as to constitute a dictionary of SIFs. And the SIFs relating to the targets can in their turn be determined during a stage of operation in which the SIFs obtained from each target are compared with the SIFs in said dictionary.

For empirical determination of the number and optimum positions of the rotation-tilt pairs to be effected in order to guarantee acceptable results, the method according to the invention is carried out, in which the query contains any view taken of an object of shape similar or identical to the shape of another object contained in the target from any view, and rotation-tilt pairs are determined, i.e. this optimum number and these optimum positions as being those for which the SIFs of the two objects are similar, for a large number of objects tested.

The method according to the invention envisages producing one and the same number of simulated images for the query and for the target, and for the same rotation-tilt pairs. But it also envisages the case when a different number of simulated images is produced for the query and for the target, in particular with different or identical tilts.

Advantageously, the number of rotations per tilt increases at the same time as the value of the tilt increases. Preferably, the tilt is defined as a function of the latitude in a hemisphere above the digital image, and the difference in latitude between two consecutive tilts decreases at the same time as the tilt increases. In particular, the latitude can be measured by a parameter $\theta$ in the range from 0 to 90 degrees, or alternatively by a tilt parameter defined by $t=1/|\cos(\theta)|$. These characteristics make it possible to have simulated positions closer and closer to the camera when the latitude tends towards 90°.

According to an advantageous characteristic of the invention, for a given rotation, the tilts considered form approximately, i.e. with a tolerance, a finite geometric progression 1, $a$, $a^2$, $a^3$, . . . , $a^n$, $a$ being a number greater than 1. As a non-limitative example, $a$ is of the order of root 2 ($\sqrt{2}$) and n can be from 2 to 6 if the rotation-tilt pairs are applied both on the target and on the query, and from 2 to 12 if the rotation-tilt pairs are applied on just one of the two images.

According to another advantageous characteristic of the invention, for a given tilt t, the digital rotations, for example starting from the tilt t=a, form approximately, i.e. with a tolerance, an arithmetic progression 0, b/t, 2b/t, . . . , kb/t degrees, with b in degrees and k an integer.

Preferably, b is of the order of 72 degrees, and k is the last whole value such that kb/t is less than 180 degrees. With these typical values, (180/72)·t images=2.5·t images are simulated for each tilt t tested.

Advantageously, applying a tilt t consists of under-sampling the digital image in one direction with a value equal to t, which divides its area by t. A tilt can also be applied by combining an under-sampling of the digital image according to one direction with an over-sampling in a direction orthogonal to the preceding direction.

To prevent the total area simulated exceeding that of the initial image by too much, we can use for example a=root 2 and n=4. If each tilt t is obtained by under-sampling, this divides the area of the image after tilt by t. Therefore, images whose total area is 180·t/(72·t)=2.5 times the area of the initial image are simulated for each t. The area processed is therefore equal to 2.5 times the area of the initial image multiplied by the number of tilts. The area simulated is therefore 2.5·n=10 times that of the initial image. If, however, the method according to the invention is applied to zoom-outs with a factor 3 of the query and target images, the area simulated is just 10/9=1.11 times the initial area. Therefore, the method according to the invention takes a time comparable to the SIFT method, for example, while permitting the recognition of oblique views up to a transition tilt of 16. However, a tilt can be simulated by combining an over-sampling in one direction and an under-sampling in the orthogonal direction, so that the area of the image remains constant and does not decrease (see definition of tilt later).

Thus, with the method according to the invention, simulating all the views depending on two parameters while retaining a reasonable calculation time and memory is made possible because the space of the two parameters rotation and tilt is sampled with quite few values for each parameter, and because simulation of the distortions due to the oblique views can reduce the size of the images by under-sampling. This makes it possible to generate virtually all possible views at a given precision, while not excessively expanding the storage capacity required.

According to an advantageous embodiment of the invention, the method according to the invention can be applied to said digital image in comparison with the same digital image or a transform of the latter, for example an axial symmetry, so as to determine symmetries, repeated shapes or shapes having periodicities in this digital image.

According to another aspect of the invention, a device is envisaged for the application of a method for object recognition in at least one digital image according to the invention. This device comprises a processing circuit configured for:
a) applying from said digital image a plurality of digital rotations and at least two digital tilts different from 1 in order to develop a simulated image for each rotation-tilt pair; and
b) applying an algorithm invariant in translation, rotation and zoom onto the simulated images in order to determine local characteristics called SIF (scale invariant features) and used for recognising objects.

This device advantageously comprises a memory space in which a dictionary of SIFs is stored; and the processing circuit is configured so as to compare the SIFs of said digital image (initial image) with the SIFs of said dictionary.

According to the invention, the processing circuit can be configured so as to process an arbitrary number of images in parallel.

BRIEF DESCRIPTION OF THE DRAWINGS

Other advantages and characteristics of the invention will become apparent on examination of the detailed description of an embodiment which is in no way limitative, and the attached diagrams, in which:

FIGS. 7 and 8 are views illustrating the difference between absolute tilts and relative tilts, or transition tilts.

DETAILED DESCRIPTION OF THE PREFERRED EMBODIMENTS

Figure 1:
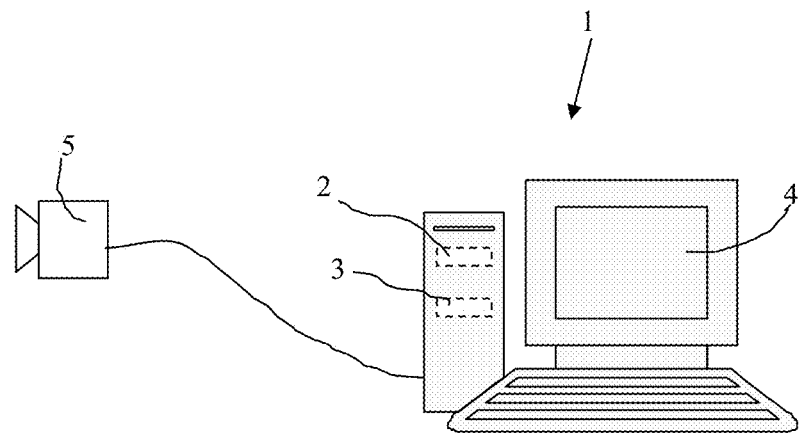
FIG. 1 is a general view of a device implementing the method according to the invention.

FIG. 1 shows a processing unit 1 such as a computer equipped with software and peripherals necessary for its proper operation. It in particular comprises a processing circuit 2 such as a microprocessor or a dedicated microcontroller which is configured so as to process images according to the method of the present invention. There is also a conventional memory space 3 suitable for storing in particular the SIFs in the form of a dictionary. This computer is equipped with a display monitor 4 on which the processed images can be displayed.

A camera 5 is connected to computer 1 via a connecting cable. However, other means of connection, in particular wireless, can be used. It is also possible to recover images previously acquired and stored in fixed or portable storage means of the computer.

Although the invention is not limited to this, the method of recognition according to the invention will now be described, applied for object recognition between a target image and a query image.

Figure 2:
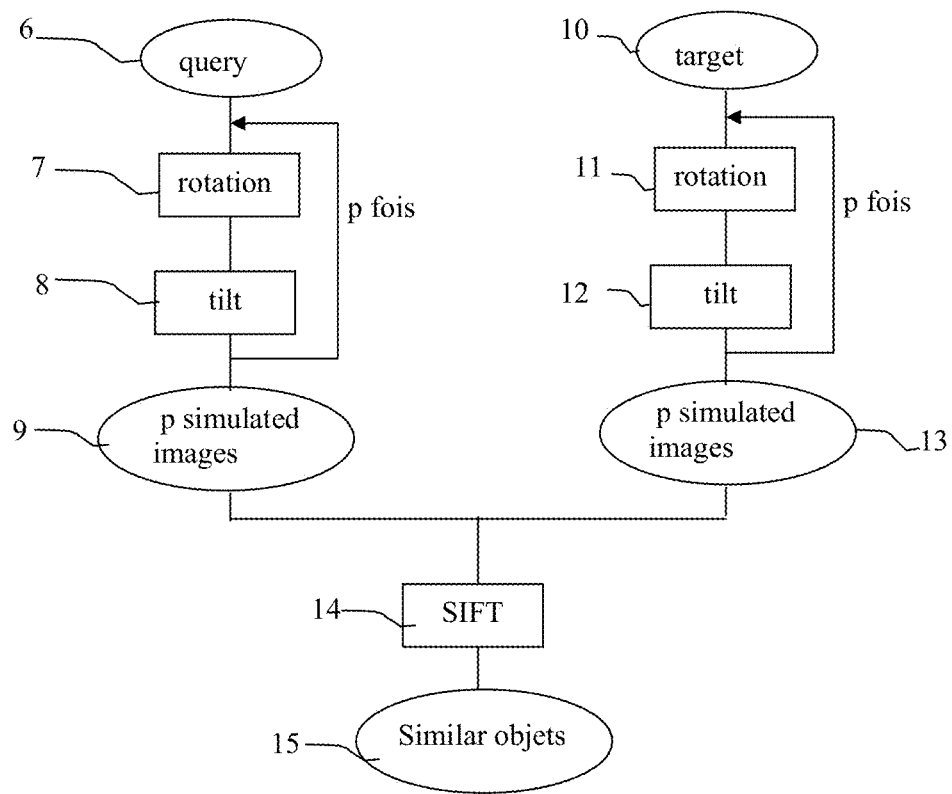
FIG. 2 is a simplified flowchart of the steps of the method according to the invention.

In FIG. 2, the flowchart illustrates the parallel processing of the two images, query 6 and target 10.

Figure 3:
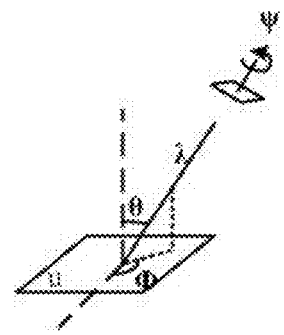
FIG. 3 is a general view illustrating the four principal parameters describing the positions of a camera.

Starting from the two images, query 6 and target 10, a first simulated image is produced for a rotation 7,11 and tilt 8,12 pair, and steps 7,11 and 8,12 are performed several times, for example p times, so as to generate p simulated images at 9 and 13. In other words, each of the images undergoes the same processing, consisting of simulating all the possible distortions due to the changes in orientation of the camera axis, which is a space with two parameters, called longitude and latitude. In FIG. 3, for example, the angle theta θ is the latitude and the angle phi φ is the longitude.

These simulated images are produced for a finite number p of pairs of longitudes and latitudes, with sampling which makes the number of views effectively simulated small (a few tens), while guaranteeing that the few tens of simulated images remain close to any other possible view.

Figure 4:
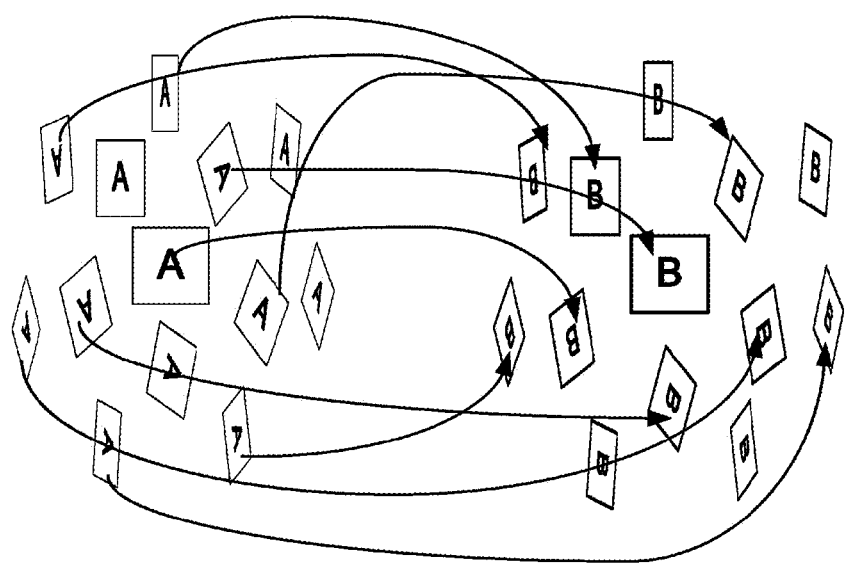
FIG. 4 is a general view illustrating multiple comparisons between simulated images.

In step 14 in FIG. 2, the images thus simulated are then compared with one another by any one of the already existing algorithms which perform an effective recognition modulo an image rotation (=rotation of the camera about its optical axis), a translation (=movement of the camera perpendicular to its axis) and a zoom (=movement of the camera on its optical axis). Such an algorithm is in particular the SIFT algorithm as described in document U.S. Pat. No. 6,711,293. FIG. 4 shows an illustration of multiple comparisons carried out on the simulated images. The two images query A and target B represented by two squares, surrounded by their simulated views (parallelograms) obtained by two tilts and the associated rotations. The arrows joining parallelograms of one of the images to some parallelograms of the other indicate that comparisons are made between the simulated views of one image and the simulated views of the other.

The output 15 can be a list (optionally empty) of pairs of sub-images of the query and the target which includes an object recognized on the two images, as well as the affine transformation identified as making it possible to transform one of the sub-images into the other.

FIG. 3 illustrates the four principal parameters inducing a deformation of the image taken by a camera: the camera can rotate through an angle psi $\psi$, its optical axis can adopt an angle theta $\theta$ (latitude) relative to the frontal axis, and this inclination by an angle theta is performed in a vertical plane making an angle phi $\phi$ (longitude) with a fixed direction.

The method according to the invention makes it possible to generate all the affine deformations that would be due to the changes in direction of the axis of the camera at infinity observing the plane image frontally, these deformations depending therefore on the two parameters, longitude and latitude, which are sampled so that the number of views generated is a few tens. The longitudes simulated become more and more numerous when the latitude increases. But when the latitude increases, the images are also optionally under-sampled more and more in one direction and therefore smaller and smaller, the rates of under-sampling then being a geometric progression.

Even more precisely, the latitude is measured by a parameter $\theta$ in the range from 0 to 90 degrees, or alternatively by a tilt parameter defined by $t=1/|\cos(\theta)|$. The longitude is described by a parameter $\phi$ (see FIG. 3). The values of the tilt t are staggered logarithmically and those of $\phi$ arithmetically.

The displacement of the camera from one position to another can be defined by a transform A given by:

$$A = H_\lambda R_1(\psi) T_t R_2(\phi) = \lambda \begin{bmatrix} \cos\psi & -\sin\psi \\ \sin\psi & \cos\psi \end{bmatrix} \begin{bmatrix} t & 0 \\ 0 & 1 \end{bmatrix} \begin{bmatrix} \cos\phi & -\sin\phi \\ \sin\phi & \cos\phi \end{bmatrix}$$

Transform A is a linear transform of the plane associated with a 2×2 matrix with four elements (a, b, c, d). Given an image u(x,y), interpreted as an image viewed frontally by an optical camera, the application u(x,y)→u(A(x,y)) is then interpreted as the deformation of the image that will be observed when the camera turns on its optical axis through an angle psi $\psi$, when it slides on its optical axis moving away (or getting closer if lambda $\lambda$<1) on this axis by a factor lambda, and when its optical axis moves away from its frontal position by a combination of a change of latitude theta $\theta$ and a change of longitude phi $\phi$. The camera can also begin moving in translation perpendicular to its optical axis, which leads to a previous translation of the image (e,f) not taken into account in the preceding formula.

This translation (e, f), the zoom lambda $\lambda$ and the rotation psi $\psi$ are the four parameters mastered by the state of the art. The present invention relates to the manner of recognizing an image when it has additionally undergone the deformations caused by the changes of latitude and longitude.

Figure 5:
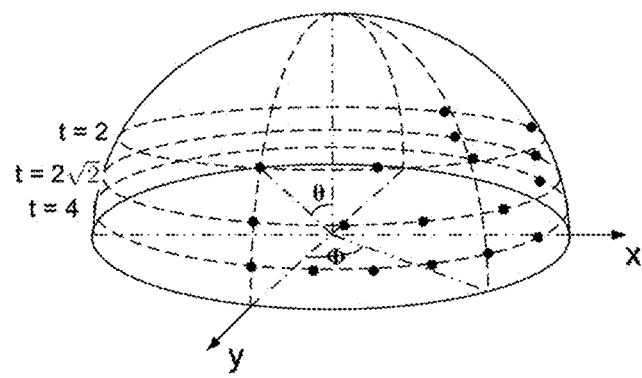
FIG. 5 is a general view illustrating a sphere in which rotation-tilt pairs are inscribed.

FIG. 5 illustrates a sphere on which tilts and rotations are positioned. This figure shows a perspective view of the positions of the cameras that would be simulated for the tilts 2, 2√2 and 4, i.e. for the angles 60°, 69.30° and 75.52° respectively. There are more and more angles of rotation when the tilts increase.

Figure 6:
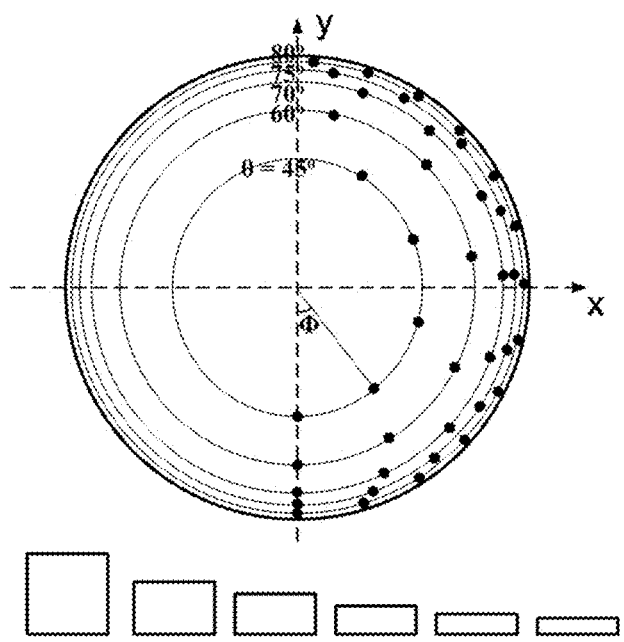
FIG. 6 is a general view illustrating a distribution of the positions of the simulated tilts and rotations on the sphere in FIG. 5.

FIG. 6 illustrates a distribution of the positions of the tilts and rotations. Each circle corresponds to a tilt. The innermost circle is for the tilt associated with theta $\theta$=45°, and the next circles correspond to theta $\theta$=60, 70, 75 and 80°. The more the tilt increases, the more necessary it is to increase the number of positions on the circle, i.e. the number of longitudes phi $\phi$. The points indicated therefore have as coordinates $\sin(\theta)\cos(\phi)$ and $\sin(\theta)\sin(\phi)$. The rectangles indicate the deformation of a square image caused by each tilt.

The Method According to the Invention Involves a Certain Number of Terms Known to a Person Skilled in the Art, which are Summarized Below Rotation of the digital image u(x,y): calculation, by interpolation from the values u(x,y) to the pixels (x,y) of the image, of the values v(x,y)=u(R(x,y)) where R is a planar rotation of angle phi, described by a matrix with two rows and two columns of parameters ($\cos(\phi)$, $-\sin(\phi)$, $\sin(\phi)$, $\cos(\phi)$). The visual effect is that the image turns on the computer screen through an angle $\phi$. This operation in particular simulates the effect that would be produced by a rotation, about its optical axis, of a camera taking the image in frontal view.

Tilt of the digital image in the x direction: set v(x,y)=u(xa, y/b), and ab=t is the "tilt factor", abbreviated to "tilt". This operation simulates the result on an image u(x,y), assumed to be observed frontally by a camera at infinity, of inclination of the optical axis of the camera in the x direction. The angle of the optical axis to the normal direction is one of the two values theta $\theta$ between −90° and +90° such that $t=1/|\cos(\theta)|$. The image u(x,y) is the frontal view and the image v(x,y) is therefore the oblique view after tilt t by an angle $\theta$ in the x direction. On the digital image, the tilt can be obtained by over-sampling the image by a factor b in the y direction, and by under-sampling the image by a factor a in the x direction, where b is an arbitrary factor between 1 and t. If a=t, b=1, there is just an under-sampling in the x direction, and if a=1, b=t, there is just an over-sampling in the y direction. In the case of under-sampling, the image must be smoothed beforehand in the x direction by convolution of the image with a one-dimensional low-pass filter. If a=t, and b=1, the digital image after tilt has an area divided by t (and the area does not change if a=√t, b=√t).

Zoom-out of the digital image: application to the image u(x,y) of a convolution v(x,y)=(G*u) by a low-pass filter $G_h(x,y)=(1/h^2)G(x/h,y/h)$, followed by an under-sampling v(x,y)=(G_h*u)(xh,yh), where h is the zoom-out factor. This operation simulates moving-away of the camera relative to the image, the distance from the object before moving-away being in the ratio h to the distance after moving-away. The function G(x,y), often a Gaussian, simulates the optical convolution kernel of a camera. A digital zoom-in is obtained by simple interpolation. A zoom-out or zoom-in is a quite short zoom.

Absolute tilt and relative tilt: Absolute tilt is the term for the factor $t=1/|\cos(\theta)|$ of image compression in one direction resulting from passage of the camera from a frontal position opposite a plane object, to an oblique view. Now imagine that one and the same plane object has been photographed by a camera in two positions for which the optical axis passes through the same point of the image. The position of the axis of the first camera is described by two angles $\theta$ and $\phi$ and that of the second by two angles $\theta'$ and $\phi'$. When $\phi=\phi'$, the tilt that must be applied to one of the two images to pass directly to the other (apart from a zoom) is equal to the ratio t'/t, where t' denotes the larger of the two tilts, and t the smaller. When $\phi=\phi'+90°$, this same tilt that has to be applied to one of the two images u(tx,y) to pass to the other u(x,t'y) is maximum and equal to the product tt'. This explains why, for comparing oblique views, it is advantageous to simulate large tilts, which can exceed 40. FIGS. 7 and 8 in particular show an illustration of the difference between absolute tilts and relative tilts, or transition tilts. On the left, in FIG. 7, we see the camera in two positions corresponding to the values of θ=30° and 60°, with φ=φ'. One of the tilts is equal to 2, the other to 2/√3, and the relative transition tilt for passing from v to v' is therefore √3, which is smaller than the tilt that passed from u to v'. Therefore when the tilts take place in the same plane (φ=φ'), it can be seen that the tilts to be simulated are smaller than the original tilts. On the right, the tilt plane has changed: we have φ−φ'=90°, and the tilts are t=2 from u to v, and t'=4 from u to v'. In this case, the tilts are multiplied, and the relative tilt, of transition from v to v', is 2×4=8.

SIF ("scale invariant feature"): numbers or sets of numbers attached to a digital image and which change little when the image is rotated, or when it is translated, and that can also be maintained with little change when a zoom is applied to the image. The SIFs therefore make it possible to recognize pixels in the image independently of their position, framing, orientation, and zoom. A classical example of such indicators is obtained by the SIFT ("scale invariant feature transform") method.

The present invention can be applied effectively to one of the following fields:
- comparison of different images of a film or of the images of several films;
- comparison of different images taken by one camera or several cameras placed in successive or simultaneous positions;
- use on board a vehicle equipped with cameras, for example for its navigation;
- detection of oblique symmetries in an image by application of the method to the image and to the image symmetrized relative to an arbitrary straight line;
- recognition of moving objects (humans, animals, machines);
- comparison or classification of photographs, paintings, and generally visual art works;
- organization and management of large individual or collective image databases;
- reconstruction of the relief of a scene or of an object from several views;
- calibration or grading of images taken by one or more cameras;
- cartography, plane, or in relief by comparison of aerial, spatial, or terrestrial views;
- recognition of symbols, words, printed characters or logos; and
- application to a film for tracking an object present in one whole sequence.

Of course, the invention is not limited to the examples which have just been described and numerous adjustments can be made to these examples without exceeding the scope of the invention.

The invention claimed is:

1. A method for object recognition applied to a digital image called a query and to a digital image called a target, the method comprising:
   simulating, by one or more processors, from each of the digital images a plurality of digital rotations and at least two digital tilts different from 1 in order to develop a simulated image for each rotation-tilt pair; and
   applying an algorithm, by the one or more processors, generating values that are invariant in translation, rotation and zoom onto the simulated images in order to determine local characteristics, called scale invariant features (SIF), used for recognizing similar or identical objects between the query and the target.

2. The method according to claim 1, wherein the query contains any view taken of an object with a shape similar or identical to the shape of another object contained in the target from any view, and
   rotation-tilt pairs are determined for which the SIFs of two objects are similar.

3. The method according to claim 1, wherein one and the same number of simulated images are produced for the query and for the target, and for the same rotation-tilt pairs.

4. The method according to claim 1, wherein a different number of simulated images is produced for the query and for the target.

5. The method according to claim 1, wherein the number of rotations per tilt increases at the same time as the value of the tilt increases.

6. The method according to claim 1, wherein the tilt is a function of the latitude in a hemisphere above the digital image, and
   the difference in latitude between two consecutive tilts decreases at the same time as the latitude increases.

7. The method according to claim 1, wherein the tilts considered form approximately a finite geometric progression 1, $a, a^2, a^3, \ldots, a^n$, a being a number greater than 1.

8. The method according to claim 7, wherein a is of the order of root 2 and n is in the range from 2 to 6 when the rotation-tilt pairs are applied both on the target and on the query, and from 2 to 12 when the rotation-tilt pairs are applied on just one of the two images.

9. The method according to claim 1, wherein, for a given tilt t, the digital rotations form an approximately arithmetic progression $0, b/t, 2b/t, \ldots, kb/t$ degrees, with b in degrees and k an integer.

10. The method according to claim 9, wherein b is of the order of 72 degrees, and k is the last whole value such that kb/t is less than 180 degrees.

11. The method according to claim 1, wherein applying a tilt t consists of under-sampling the digital image in a fixed direction from a value equal to t.

12. The method according to claim 1, wherein applying a tilt t consists of under-sampling the digital image in a fixed direction and over-sampling in a direction orthogonal to the preceding.

13. The method according to claim 1, wherein the method is applied to one or more images called queries and one or more images called targets,
   the SIFs relating to the query are determined in the course of a previous stage of calibration so as to constitute a dictionary of SIFs; and
   the SIFs relating to the targets are respectively determined in the course of a stage of operation during which the SIFs obtained from each target are compared with the SIFs in said dictionary.

14. The method according to claim 1, wherein the method is applied to a digital image by comparison with the same digital image or a transform of the same digital image, and oblique symmetries, repeated shapes or shapes having periodicities in the same digital image are determined.

15. A Device for object recognition between a digital image which is a query and to a digital image which is a target, the device comprising:
   a processing circuit configured to:
      apply from each of the digital images a plurality of digital rotations and the at least two digital tilts different from 1 in order to develop a simulated image for each rotation-tilt pair, and apply an algorithm generating values that are invariant in translation, rotation and zoom onto the simulated images in order to determine local characteristics, called scale invariant features (SIF), used to recognize similar or identical objects between the query and the target.

16. The device according to claim 15, further comprising a memory space in which a dictionary of SIFs is stored,
wherein the processing circuit is configured so as to compare SIFs of said digital image with the SIFs in said dictionary.

17. The method according to claim 2, wherein one and the same number of simulated images are produced for the query and for the target, and for the same rotation-tilt pairs.

18. The method according to claim 2, wherein a different number of simulated images is produced for the query and for the target.

* * * * *

UNITED STATES PATENT AND TRADEMARK OFFICE
CERTIFICATE OF CORRECTION

PATENT NO.       : 8,687,920 B2  
APPLICATION NO.  : 12/993499  
DATED            : April 1, 2014  
INVENTOR(S)      : Morel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 439 days.

Signed and Sealed this

Twenty-ninth Day of September, 2015

Michelle K. Lee
*Director of the United States Patent and Trademark Office*